United States Patent
Kubo

(10) Patent No.: US 10,153,961 B2
(45) Date of Patent: Dec. 11, 2018

(54) COMMUNICATION DEVICE, COMMUNICATION METHOD, AND COMMUNICATION SYSTEM

(71) Applicant: Oki Electric Industry Co., Ltd., Tokyo (JP)

(72) Inventor: Yuki Kubo, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 85 days.

(21) Appl. No.: 15/158,566

(22) Filed: May 18, 2016

(65) Prior Publication Data

US 2016/0352470 A1 Dec. 1, 2016

(30) Foreign Application Priority Data

Jun. 1, 2015 (JP) .................................. 2015-111492

(51) Int. Cl.
| | |
|---|---|
| H04L 12/26 | (2006.01) |
| H04B 17/318 | (2015.01) |
| H04L 1/18 | (2006.01) |
| H04W 84/18 | (2009.01) |
| H04W 4/80 | (2018.01) |

(52) U.S. Cl.
CPC ........... *H04L 43/16* (2013.01); *H04B 17/318* (2015.01); *H04L 1/1883* (2013.01); *H04W 4/80* (2018.02); *H04W 84/18* (2013.01)

(58) Field of Classification Search
None
See application file for complete search history.

(56) References Cited

U.S. PATENT DOCUMENTS

| | | | | |
|---|---|---|---|---|
| 6,944,123 | B1 * | 9/2005 | Moon | H04W 72/005 370/216 |
| 2003/0002449 | A1 * | 1/2003 | Rittle | H04L 1/1671 370/277 |
| 2006/0050659 | A1 * | 3/2006 | Corson | H04W 4/08 370/310 |

OTHER PUBLICATIONS

IEEE Standard 802.15.4. Wireless Medium Access Control (MAC) and Physical Layer (PHY) Specifications for Low-Rate Wireless Personal Area Networks, 2003.
M. Buettner, G. Yee, E. Anderson and R. Han, "X-Mac: A Short Preamble MAC Protocol for Duty-Circled Wireless Sensor Networks", SenSys, 2006.

* cited by examiner

*Primary Examiner* — James P Duffy
(74) *Attorney, Agent, or Firm* — Rabin & Berdo, P.C.

(57) ABSTRACT

Provided is a communication device including: a response request determination unit that determines whether a response request is included, from content of a transmission frame; a transmission unit that carries out processing to transmit a frame; a timer that starts to measure a time period after transmission processing is completed; a reception state determination unit that determines whether a response frame is being received when a first time period is measured; a communication processing deciding unit that decides that the time period to be measured by the timer is to be extended by a second time period in when it has been determined that the response frame is being received, and decides that predetermined processing is to be carried out when it has been determined that the response frame is not being received; and a response reception check unit that checks whether the response frame is being received correctly.

4 Claims, 6 Drawing Sheets

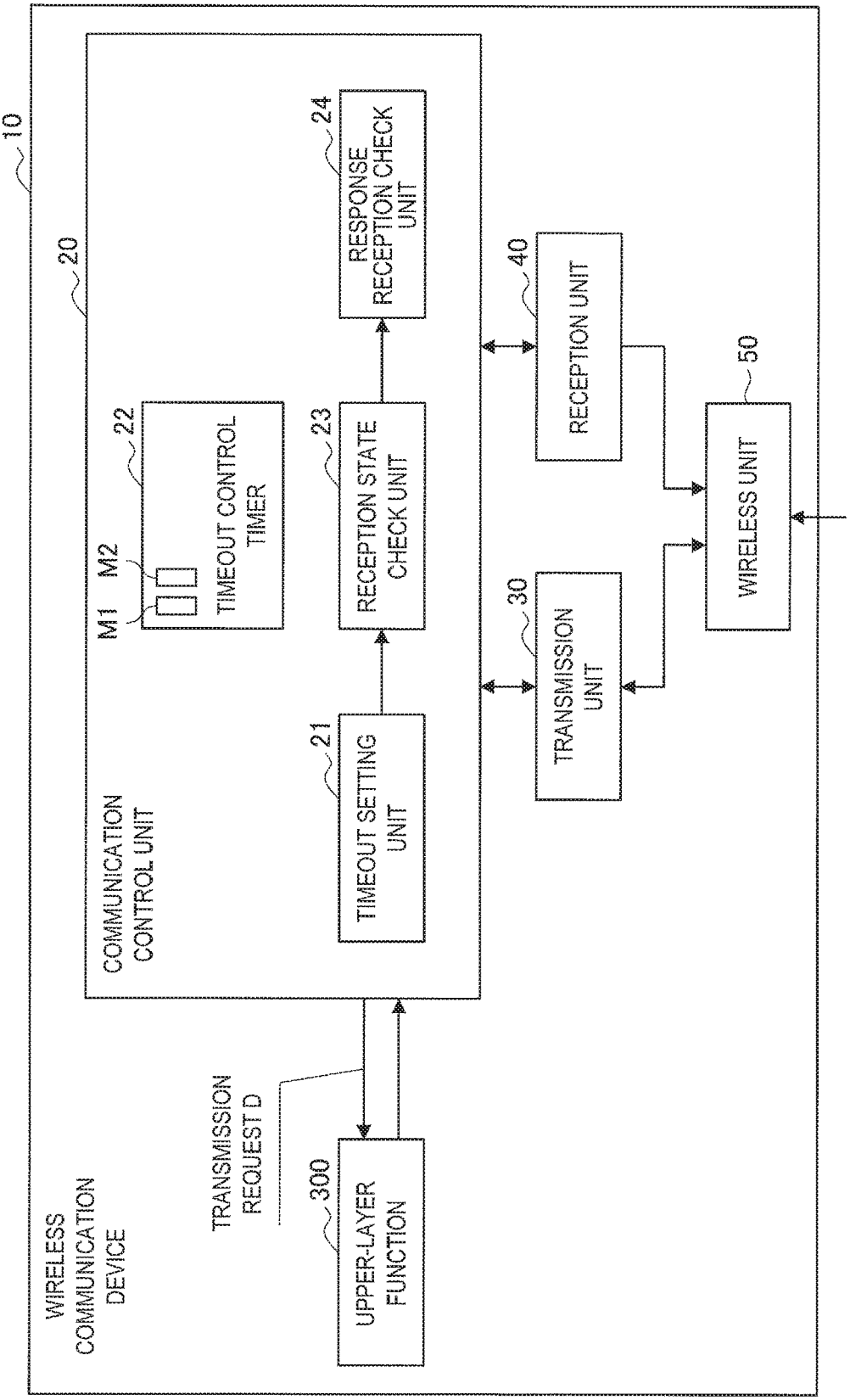

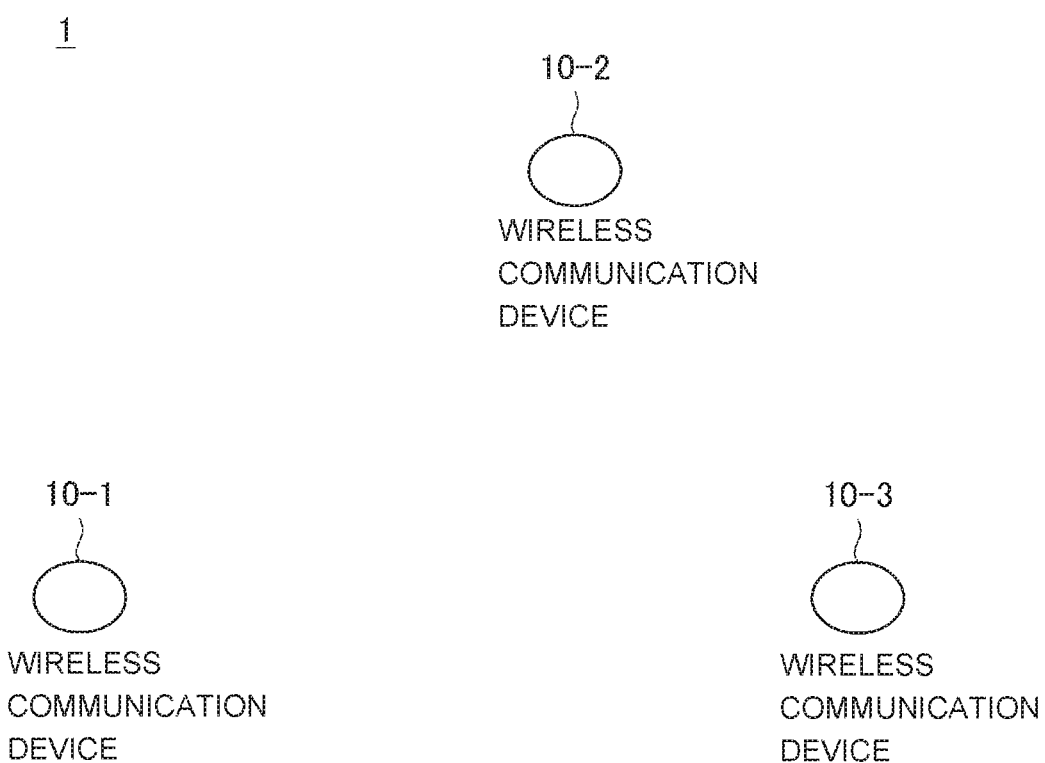

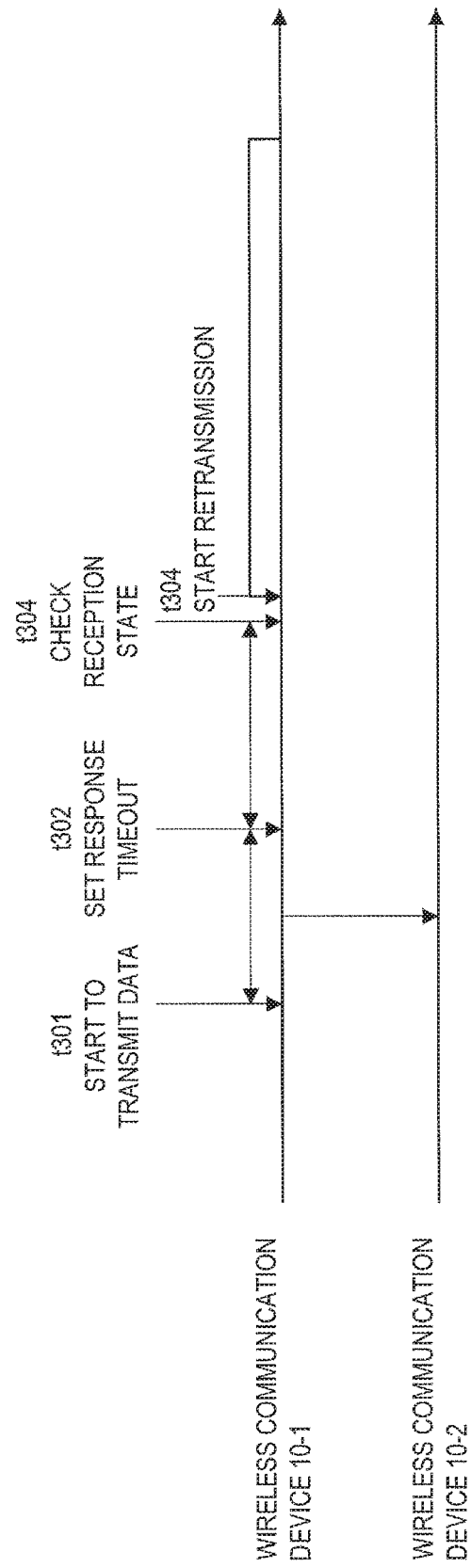

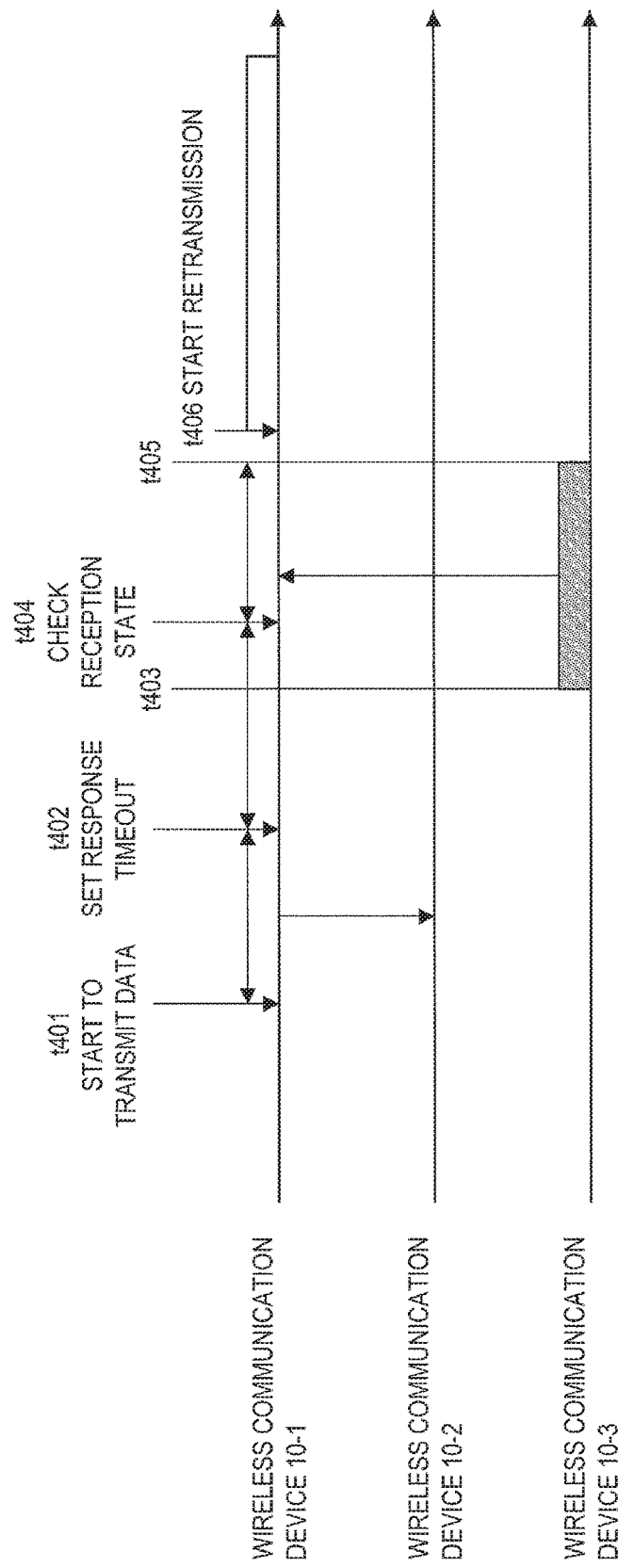

COMMUNICATION DEVICE, COMMUNICATION METHOD, AND COMMUNICATION SYSTEM

CROSS REFERENCE TO RELATED APPLICATION(S)

This application is based upon and claims benefit of priority from Japanese Patent Application No. 2015-111492, filed on Jun. 1, 2015, the entire contents of which are incorporated herein by reference.

BACKGROUND

The present invention relates to a communication device, a communication method, and a communication system. For example, the present invention may be applied to a communication device for requesting a response from an opposing communication device and waiting for a certain time period.

For example, a communication device constituting a sensor network is configured to carry out communication while saving electric power.

Examples of a technology for normally carrying out mutual data communication between a communication device at a transmission side and a communication device at a reception side include the following document.
Non Patent Literature 1: IEEE Standard 802.15.4. Wireless Medium Access Control (MAC) and Physical Layer (PHY) Specifications for Low-Rate Wireless Personal Area Networks, 2003
Non Patent Literature 2: M. Buettner, G Yee, E. Anderson and R. Han, "X-MAC: A Short Preamble MAC Protocol For Duty-Circled Wireless Sensor Networks", SenSys 2006

According to the technology described in Non Patent Literature 1, in the case where a communication device at a transmission side transmits a frame with a response request in processing of a media access layer (MAC layer), the communication device waits for a response acknowledgement (frame) from a communication device at a reception side for a response waiting time (macAckWaitDuration). When receiving the response, the communication device at the transmission side decides that the transmission has been normally completed. When there is no response, the communication device at the transmission side decides that the abnormality has occurred and retransmits the frame. The response waiting time is calculated from a time spent on switching a wireless unit from a reception state to a transmission state, an expected response frame length, and the like. As the response waiting time, an expected time period in which reception of the expected response frame is completed is set.

On the other hand, according to the technology described in Non Patent Literature 2, a communication device at a transmission side transmits a series of frames called short preambles before transmitting a data frame, and a communication device at a reception side which carries out intermittent reception transmits a response frame to the short preambles. Subsequently, the communication device at the transmission side transmits the data frame (see FIG. 1 in Non Patent Literature 2).

SUMMARY

However, according to the technology described in Non Patent Literature 1, any processing cannot be carried out until a next frame is transmitted in the case where the communication device at the transmission side loses the response frame from the communication device at the reception side, and sometimes this leads to inefficiency.

In addition, according to the technology described in Non Patent Literature 2, a reception waiting time (in other words, boot-up time) of the communication device at the reception side which receives shorts preambles (intermittent reception) is decided depending on transmission intervals of the short preambles of the communication device at the transmission side. Therefore, unfortunately, the boot-up time of the communication device at the reception side becomes longer in some states of the communication device at the transmission side, and this leads to extra power consumption Therefore, a communication device, communication method, and communication system capable of effectively controlling exchange of frames have been desired.

According to a first present invention, a communication device includes a communication unit configured to exchange a signal with an opposing communication device, the communication device includes: (1) a response request determination unit configured to determine whether or not a transmission frame to the opposing communication device includes a response request on the basis of a content of the transmission frame; (2) a transmission unit configured to carry out processing to transmit a frame including a response request by using the communication unit; (3) a timer configured to start to measure a time period after the transmission unit completes the processing to transmit the frame including the response request; (4) a reception state determination unit configured to determine whether or not the communication unit is receiving a response frame when the timer measures a first time period; (5) a communication processing deciding unit configured to decide that the time period to be measured by the timer is to be extended by a second time period in a case where the reception state determination unit has determined that the response frame is being received, and configured to decide that predetermined processing is to be carried out in a case where the reception state determination unit has determined that the response frame is not being received; and (6) a response reception check unit configured to check whether or not the communication unit is correctly receiving the response frame from the opposing communication device.

According to a second present invention, a communication method is a method for controlling a communication device that includes a response request determination unit, a transmission unit, a timer, a reception state determination unit, a communication processing deciding unit, a response reception check unit, and a communication unit configured to exchange a signal with an opposing communication device. (1) The response request determination unit determines whether or not a transmission frame to the opposing communication device includes a response request on the basis of a content of the transmission frame. (2) The transmission unit carries out processing to transmit a frame including a response request by using the communication unit. (3) The timer starts to measure a time period after the transmission unit completes the processing to transmit the frame including the response request. (4) The reception state determination unit determines whether or not the communication unit is receiving a response frame when the timer measures a first time period. (5) The communication processing deciding unit decides that the time period to be measured by the timer is to be extended by a second time period in a case where the reception state determination unit has determined that the response frame is being received, and the communication processing deciding unit decides that predetermined processing is to be carried out in a case where the reception state determination unit has determined that the response frame is not being received. (6) The response reception check unit checks whether or not the communication unit is correctly receiving the response frame from the opposing communication device.

A communication program according to a third present invention causes a computer installed in a communication device that includes a communication unit configured to exchange a signal with an opposing communication device, to function as: (1) a response request determination unit configured to determine whether or not a transmission frame to the opposing communication device includes a response request on the basis of a content of the transmission frame; (2) a transmission unit configured to carry out processing to transmit a frame including a response request by using the communication unit; (3) a timer configured to start to measure a time period after the transmission unit completes the processing to transmit the frame including the response request; (4) a reception state determination unit configured to determine whether or not the communication unit is receiving a response frame when the timer measures a first time period; (5) a communication processing deciding unit configured to decide that the time period to be measured by the timer is to be extended by a second time period in a case where the reception state determination unit has determined that the response frame is being received, and configured to decide that predetermined processing is to be carried out in a case where the reception state determination unit has determined that the response frame is not being received; and (6) a response reception check unit configured to check whether or not the communication unit is correctly receiving the response frame from the opposing communication device.

According to a fourth present invention, a communication system includes a plurality of communication devices. To each of the communication devices, the communication device according to the first present invention is applied.

According to the present invention, it is possible to effectively control exchange of frames.

BRIEF DESCRIPTION OF THE DRAWINGS

FIG. 1 is a block diagram illustrating a configuration of a wireless communication device according to the present embodiment;

FIG. 2 is a block diagram illustrating an entire configuration of a wireless communication device according to the present embodiment;

FIG. 4 is a time chart 2 illustrating operation of a wireless communication system according to the present embodiment; and FIG. 5 is a time chart 3 illustrating operation of a wireless communication system according to the present embodiment.

DETAILED DESCRIPTION OF THE EMBODIMENT(S)

Figure 3A:
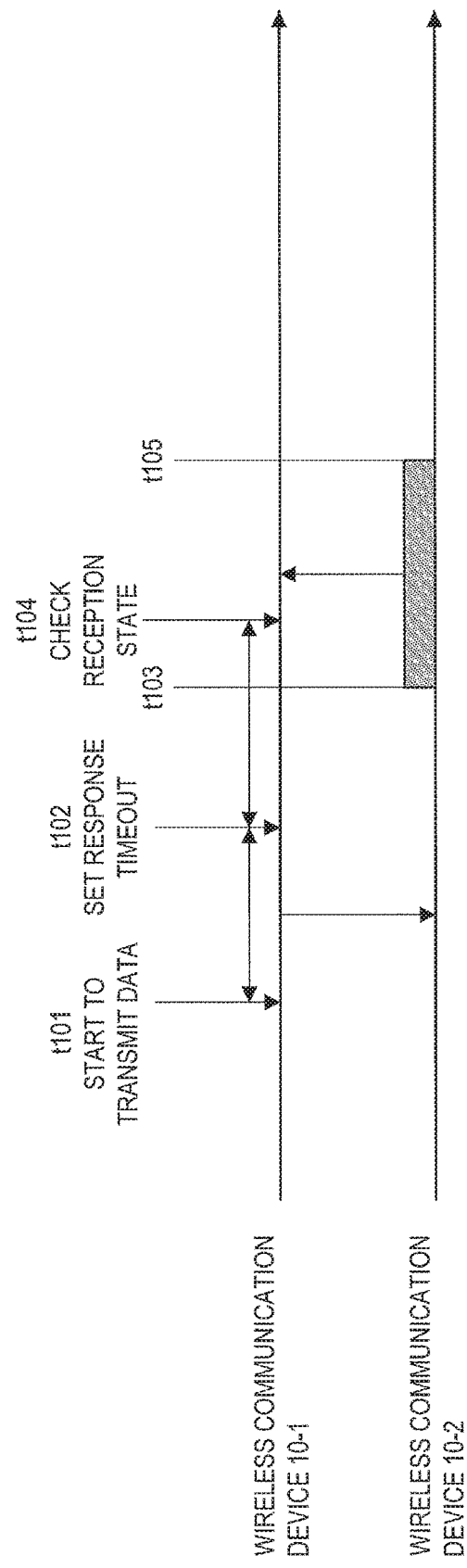
FIGS. 3A and 3B are time charts 1 illustrating operation of a wireless communication system according to the present embodiment.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

(A) Main Embodiment

Hereinafter, details of an embodiment of the communication device, communication method, and communication system according to the present invention are described with reference to drawings.

(A-1) Configuration in Embodiment

FIG. 2 is a block diagram illustrating the entire configuration of a wireless communication system 1 according to this embodiment.

To simplify the explanation, FIG. 2 illustrates an example in which the wireless communication system 1 includes three wireless communication devices 10 (10-1 to 10-3). Of course, the number of the wireless communication devices 10 is not specifically limited.

In the wireless communication system 1, wireless communication is carried out between the plurality of wireless communication devices 10 (10-1 to 10-3).

Communication methods of the wireless communication devices 10 (10-1 to 10-3) are not specifically limited. For example, various kinds of wireless LAN interfaces may be applied. Specifically, in this embodiment, the wireless communication devices 10 (10-1 to 10-3) use wireless communication methods according to IEEE802.15.4-2003.

FIG. 1 is a block diagram illustrating a configuration of a wireless communication device according to the present embodiment.

Structural elements other than a wireless unit in a wireless communication device according to a first embodiment may be constituted of hardware or may be achieved by a processor and software (wireless communication program) to be executed by the processor. In both cases, the functional configuration can be illustrated in FIG. 1.

In FIG. 1, the wireless communication device 10 includes a communication control unit 20, a transmission unit 30, a reception unit 40, a wireless unit 50, and an upper-layer function 300.

The wireless communication device 10 is a device for carrying out wireless communication with another wireless communication device 10 when the communication control unit 20 receives a signal from the upper-layer function 300.

The communication control unit 20 includes a timeout setting unit 21, a timeout control timer 22, a reception state check unit 23, and a response reception check unit 24. The communication control unit 20 is a unit for controlling communication in response to instructions from the upper-layer function 300.

The upper-layer function 300 is a function of carrying out wireless communication with the other wireless communication device 10 via the communication control unit 20. For example, the upper-layer function 300 issues instructions to exchange frames depending on operation of various applications.

The transmission unit 30 is a unit for transmitting frames via the wireless unit 50 according to the control by the communication control unit 20.

The reception unit 40 is a unit for extracting a frame received by the wireless unit 50 and providing the frame to the communication control unit 20.

The wireless unit 50 is a unit for converting the frame provided by the transmission unit 30 into a wireless signal (wave) and transmitting the wave. The wireless unit 50 is also the unit for extracting a frame from a wave received from the other wireless communication device 10 and providing the frame to the reception unit 40.

Next, the internal configuration of the communication control unit 20 will be described. A specific form of a transmission request D that the upper-layer function 300 provides to the communication control unit 20 is not limited. For example, the transmission request D may include a frame itself to be transmitted or data for generating the frame. In this embodiment, it is assumed that the transmission request D includes the frame itself to be transmitted. FIG. 1 illustrates structural elements used for carrying out frame processing for waiting for a response request in response to the transmission request D. The other structural elements are omitted.

The timeout setting unit 21 is a unit for determining whether or not to carry out the processing for waiting a response in response to the transmission request D when the upper-layer function 300 provides the transmission request D to the timeout setting unit 21. For example, the timeout setting unit 21 determines whether or not to carry out the processing for waiting for a response, from header information of the transmission request D. In the case of the wireless communication method according to IEEE802.15.4, the timeout setting unit 21 determines whether or not to carry out the processing, from a flag storing presence or absence of a response message (ACK) in an area of frame control of MAC Protocol Data Unit (MPDU) that is a frame of the MAC layer, if a transmission frame is a MAC frame.

Subsequently, in the case of frame transmission with the processing for waiting for a response, the timeout setting unit 21 sets a timer M1 to a timeout control timer 22. The timer M1 is a timer for causing the reception state check unit 23 to carry out processing when a predetermined time has elapsed after frame transmission from the wireless unit 50 is completed.

The timeout control timer 22 is a timer for measuring time in the wireless communication device 10. The timeout control timer 22 may set a plurality of timers M each of which times out when predetermined time has elapsed, at a request of the timeout setting unit 21, or the reception state check unit 23. Note that, in this embodiment, the timeout control timer 22 holds (manages) two timers M. However, the number of timers M to be held is not limited thereto. In addition, the timeout control timer 22 may configure setting (extend the time) by adding predetermined time periods while the initially set timers M (M1 and M2) are measuring the time.

Subsequently, after the set timers M (M1 and M2) has expired, the timeout control timer 22 notifies a next processing unit (reception state check unit 23 or response reception check unit 24) of a timeout event.

The reception state check unit 23 is a unit for checking a state of the reception unit 40 and determining whether or not the reception unit 40 is receiving a frame. In the case where it has been determined that the reception unit 40 is receiving the frame, the timeout setting unit 21 sets the timer M2 to the timeout control timer 22. The timer M2 is a timer for causing the response reception check unit 24 to carry out processing when a predetermined time has elapsed. On the other hand, in the case where it has been determined that the reception unit 40 is not receiving the frame, the reception state check unit 23 decides that normal transmission has failed, and carries out next processing such as retransmission processing or transmission failure processing.

Specifically, the reception state check unit 23 uses a method for deciding whether or not the reception unit 40 is receiving the frame from a status value relating to frame reception such as middle of receiving a preamble, middle of receiving a synchronization word or middle of receiving data, or a method for determining that the reception unit 40 is receiving a frame in the case where reception signal strength measured by the wireless unit 50 exceeds a predetermined threshold. For example, the reception state check unit 23 determines that the reception unit 40 is receiving the frame in the case where a received signal strength indicator (RSSI) value exceeds a predetermined threshold.

The response reception check unit 24 is a unit for determining whether or not a response frame corresponding to a transmission frame has been received. For example, the response reception check unit 24 determines whether or not the response frame has been received, from an address, a sequence number, a frame type, etc. of a received frame. In the case where the response frame has been received, the response reception check unit 24 determines that the transmission has been succeeded. On the other hand, in the case where it has been determined that the response frame has not been received, the reception state check unit 24 decides that normal transmission has failed, and carries out next processing such as the retransmission processing or the transmission failure processing.

(A-2) Operation in Embodiment

Next, operation of the wireless communication system 1 having the above described configuration in this embodiment will be described with reference to drawings. Note that, in the following descriptions, the transmission request D that the upper-layer function 300 provides to the communication control unit 20 includes the MAC frame.

Figure 3B:
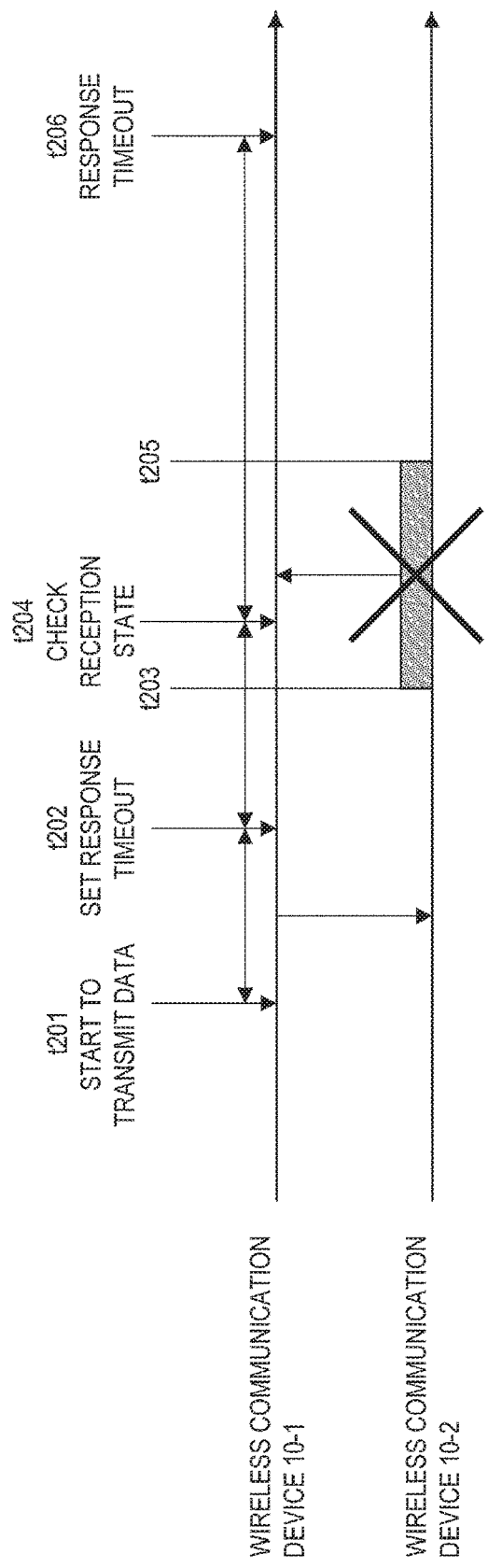

FIG. 3 is a time chart 1 illustrating operation of a wireless communication system according to the present embodiment.

FIG. 3 A illustrates operation in the case where the opposing wireless communication device 10-2 responds to a frame transmitted from the wireless communication device 10-1. On the other hand, FIG. 3 B illustrates operation in the case where a response to the frame transmitted from the wireless communication device 10-1 is detected erroneously.

First, the operation based on the time chart in FIG. 3 A will be described.

When the upper-layer function 300 provides the transmission request D, the communication control unit 20 controls the transmission unit 30 to start to transmit a frame to the opposing wireless communication device 10-2 (t101).

When the upper-layer function 300 provides the transmission request D, the timeout setting unit 21 determines whether or not to carry out the processing for waiting for a response to the transmitted frame, from information on the frame included in the transmission request D (t102). For example, in the case of the wireless communication method according to IEEE802.15.4, the timeout setting unit 21 determines whether or not to carry out the processing, from information in a response request field of frame control in a header of a MAC frame (MPDU). Note that, in this embodiment, it is assumed that the response request field of the transmission request D stores information indicating that a response message request is "present". Therefore, it is assumed that the timeout setting unit 21 carries out the processing for waiting for a response.

This leads the timeout setting unit 21 to set, to the timeout control timer 22, the timer M1 that times out when a predetermined time has elapsed after completion of frame transmission. After the set timer M1, the timeout control timer 22 notifies the reception state check unit 23 of a timeout event, the reception state check unit 23 serving as the next processing unit. Note that, the set timer M1 is an expected time period in which a head of a response frame is being received in the case where the wireless communication device 10-1 operates normally. In other words, the set timer M1 is a time period shorter than a time period in which the wireless communication device 10 normally completes reception of the response frame.

When the wireless communication device 10-2 serving as a communication device at a reception side receives the frame, the wireless communication device 10-2 starts to transmit a response frame to the wireless communication device 10-1 (t103). In other words, the wireless communication device 10-1 starts to receive the frame from the wireless communication device 10-2.

When the timeout control timer 22 notifies the reception state check unit 23 of the timeout event of the timer M1, the reception state check unit 23 checks a reception state of the reception unit 40 (t104). For example, in the case where the RSSI value measured by the wireless unit 50 is a predetermined threshold or more, the reception unit 40 sends a response to the reception state check unit 23, the response indicating that the reception unit 40 is receiving the frame. Subsequently, in the case where it has been determined that the reception unit 40 is receiving the frame, the reception state check unit 23 set, to the timeout control timer 22, the timer M2 that times out after a predetermined time. After the set timer M2, the timeout control timer 22 notifies the response reception check unit 24 of a timeout event, the response reception check unit 24 serving as a next processing unit.

The set timer M2 is a time obtained by subtracting the time of the timer M1 from an original (previous) response timeout time. The original (previous) response timeout time is macAckWaitDuration (substantially 1.1 to 2.0 milliseconds) in the wireless communication method according to IEEE802.15.4.

The communication control unit 20 checks the received frame (t105). For example, the communication control unit 20 determines that the response frame has been normally received from the wireless communication device 10-2 by verifying a sequence number of the received frame. Subsequently, the communication control unit 20 carries out processing to stop the timer M2 set to the timeout control timer 22, and the transmission of the frame with the response request has been normally completed.

Next, the operation based on the time chart in FIG. 3 B will be described.

Processing at a timing t201 to a timing t204 are similar to the processing at the timing t101 to the timing t104. Accordingly, repeated descriptions thereof are omitted.

The communication control unit 20 checks the received frame (t205). The communication control unit 20 carries out a next process after the timer M2 expires, in the case where reception of the frame from the wireless communication device 10-2 has not been acknowledged and a transmission source has not been identified due to a sequence number unintended by a sequence number of the received frame or due to a missing sequence number, even if the sequence number of the received frame has been verified.

When the timeout control timer 22 notifies of the timeout event of the timer M2, the reception state check unit 23 carries out control of retransmission (t206).

Next, operation based on the time chart in FIG. 4 will be described.

FIG. 4 illustrates operation in the case where the opposing wireless communication device 10-2 does not respond to a frame transmitted from the wireless communication device 10-1.

Processing at a timing t301 and a timing t302 are similar to the processing at the timing t101 and the timing t102. Accordingly, repeated descriptions thereof are omitted.

When the timeout control timer 22 notifies the reception state check unit 23 of the timeout event of the timer M1, the reception state check unit 23 checks a reception state of the reception unit 40 (t303). For example, in the case where the RSSI value measured by the wireless unit 50 is less than a predetermined threshold, the reception unit 40 sends a response to the reception state check unit 23, the response indicating that the reception unit 40 has not received the frame. Subsequently, in the case where it has been determined that the reception unit 40 has not received the frame, the reception state check unit 23 carries out control of retransmission (t304).

FIG. 5 illustrates operation in the case where the wireless communication device 10-2 does not respond to a frame transmitted from the wireless communication device 10-1 and another frame is received (interrupts) from the wireless communication device 10-3.

Processing at a timing t401 to a timing t404 are similar to the processing at the timing t101 to the timing t104. Accordingly, repeated descriptions thereof are omitted.

The communication control unit 20 checks the received frame (t405). Here, it is assumed that the communication control unit 20 has not acknowledged reception of the frame from the wireless communication device 10-2 due to a sequence number unintended by a sequence number of the received frame, due to a missing sequence number, or the like, even if the sequence number of the received frame has been verified. Accordingly, the communication control unit 20 checks the wireless communication device 10 that has transmitted the frame (transmission source). For example, the communication control unit 20 checks the transmission source of the received frame in view of a type of the frame, transmission address information, and the like. As a result, the communication control unit 20 carries out next processing when it has turned out that the transmission source is not the wireless communication device 10-2 requested to respond but is the wireless communication device 10-3.

The communication control unit 20 controls the wireless communication device 10-2 to retransmit the frame (t406).

(A-3) Effect in Embodiment

The following effects can be achieved in this embodiment.

The communication control unit 20 configures a setting (performs management) to divide, into two parts, timeout of waiting for a response frame from the opposing wireless communication device 10. Therefore, it is possible to carry out control of retransmission without waiting for original timeout in the case where it is expected that normal reception is not carried out at a timing of first timeout in which the response frame is expected to be received. This leads the wireless communication device 10 to reduce wasting time for waiting for the response. In other words, the wireless communication device 10 becomes to be able to improve throughput.

The communication control unit 20 also carries out processing similar to the previous processing even when the normal reception is expected to be carried out at the first timeout timing and then a response frame is received from a desired communication device.

Alternatively, even in the case where the received frame is an unintended frame (for example, frame from another wireless communication device), it is possible for the communication control unit 20 to control the desired communication device to retransmit the frame with the response request.

In the case where the wireless communication device 10 in this embodiment is applied to the wireless communication method described in Non Patent Literature 2, it is possible for the wireless communication device at the transmission side to transmit frames more continuously. Thereby, it is possible to set shorter reception waiting time of the wireless communication device at the reception side that carries out the intermittent reception. Accordingly, it is possible to reduce power consumption in the wireless communication device at the reception side.

(B) Another Embodiment

The diverse modified embodiments have been described in the above-described embodiments. In addition, the present invention can be applied to a modified embodiment exemplified as follows.

(B-1) In the above described embodiment, the example in which the wireless communication device 10 uses the wireless communication method according to IEEE802.15.4-2003 as a wireless communication method has been described. However, the present invention is not limited thereto. The present invention may be applied to a communication device using a wireless communication method advanced from, derived from, or similar to the wireless communication method according to IEEE802.15.4-2003. In addition, the present invention is not limited to the wireless communication device, and may be applied to a wired communication device.

(B-2) In the above described embodiment, a means for checking reception of a response frame to a frame with a response request by using a sequence number in accordance with a specification of the wireless communication method according to IEEE802.15.4-2003 has been described as a means for checking reception of a response frame to a frame with a response request. In the case where a communication method other than the wireless communication method is used, for example, the wireless communication device 10 may check the reception of the response frame in view of information such as a type of the frame, a transmission address, and the like in a comprehensive manner.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. A communication device that includes a communication unit configured to exchange a signal with an opposing communication device, the communication device comprising:
    a response request determination unit configured to determine whether or not a transmission frame to the opposing communication device includes a response request on the basis of a content of the transmission frame;
    a transmission unit configured to carry out processing to transmit a frame including a response request by using the communication unit;
    a timer configured to start to measure a time period after the transmission unit completes the processing to transmit the frame including the response request;
    a reception state determination unit configured to determine whether or not the communication unit is receiving a response frame when the timer measures a first time period shorter than a time to complete receiving the response frame;
    a communication processing deciding unit configured to decide that the first time period to be measured by the timer is to be extended by a second time period in a case where the reception state determination unit has determined that the response frame is being received, and configured to decide that predetermined processing is to be carried out in a case where the reception state determination unit has determined that the response frame is not being received; and
    a response reception check unit configured to check whether or not the communication unit is correctly receiving the response frame from the opposing communication device while the timer is measuring at least the first time period;
    wherein the communication processing deciding unit decides that the predetermined processing is to be carried out in a case where the response reception check unit has determined that the response frame is not being correctly received after the timer has measured the second time period; and
    wherein the predetermined processing is control of retransmission of the transmission frame.

2. The communication device according to claim 1, further comprising
    a reception-signal-strength acquisition unit configured to acquire reception signal strength of an incoming wave,
    wherein the reception state determination unit determines that the response frame is being received under a condition that the reception signal strength acquired by the reception-signal-strength acquisition unit exceeds a threshold set in advance.

3. A communication method for controlling a communication device that includes a response request determination unit, a transmission unit, a timer, a reception state determination unit, a communication processing deciding unit, a response reception check unit, and a communication unit configured to exchange a signal with an opposing communication device,
    wherein the response request determination unit determines whether or not a transmission frame to the opposing communication device includes a response request on the basis of a content of the transmission frame,
    wherein the transmission unit carries out processing to transmit a frame including a response request by using the communication unit,
    wherein the timer starts to measure a time period after the transmission unit completes the processing to transmit the frame including the response request,
    wherein the reception state determination unit determines whether or not the communication unit is receiving a response frame when the timer measures a first time period shorter than a time to complete receiving the response frame,
    wherein the communication processing deciding unit decides that the first time period to be measured by the timer is to be extended by a second time period in a case where the reception state determination unit has determined that the response frame is being received, and the communication processing deciding unit decides that predetermined processing is to be carried out in a case where the reception state determination unit has determined that the response frame is not being received,
    wherein the response reception check unit checks whether or not the communication unit is correctly receiving the response frame from the opposing communication device, wherein the communication processing deciding unit decides that the predetermined processing is to be carried out in a case where the response reception check unit has determined that the response frame is not being correctly received after the timer has measured the second time period, and wherein the predetermined processing is control of retransmission of the transmission frame.

4. A communication system comprising a plurality of communication devices, wherein, to each of the communication devices, the communication device according to claim 1 is applied.

\* \* \* \* \*